April 2, 1963  J. C. SANCHEZ  3,084,300
SEMICONDUCTOR STRAIN GAUGE
Filed Feb. 17, 1961
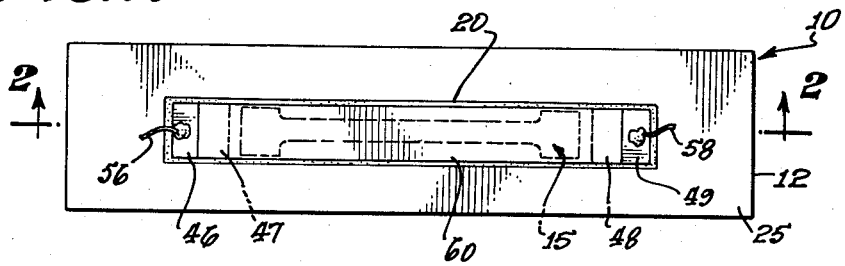
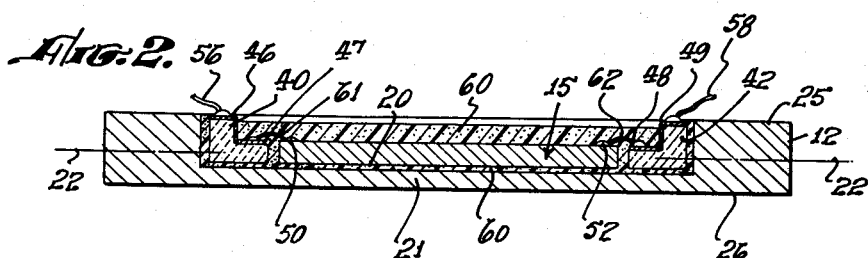
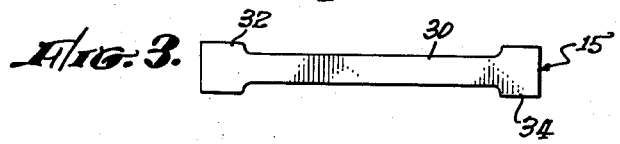
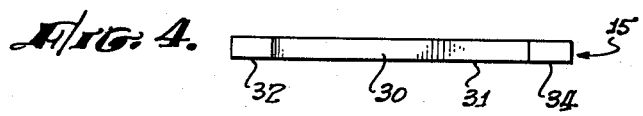
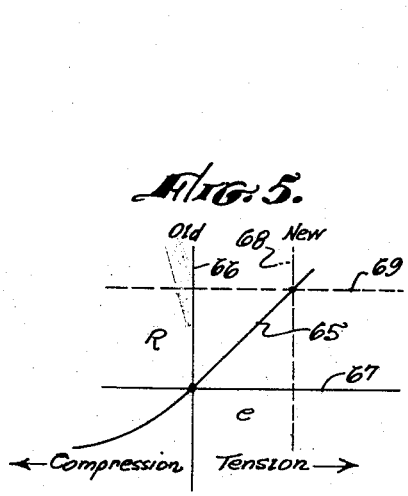
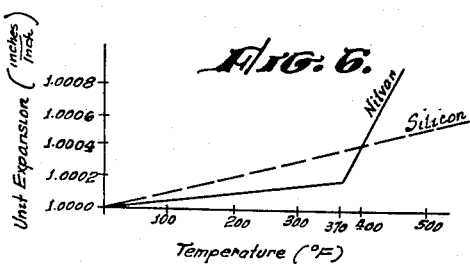
JOSEPH C. SANCHEZ,
INVENTOR.
BY HIS ATTORNEYS.
Spensley & Horn.

3,084,300
SEMICONDUCTOR STRAIN GAUGE
Joseph C. Sanchez, Pasadena, Calif., assignor to Micro-Systems, Inc., San Gabriel, Calif., a corporation of California
Filed Feb. 17, 1961, Ser. No. 89,975
8 Claims. (Cl. 338—2)

This invention relates to strain-electric translating elements.

The present invention device further relates to and may be employed in various types of transducers, such as motion sensing devices, accelerometers and other instruments for measuring movements, forces and pressures. Strain gauge elements are employed in two basic configurations, bonded and unbonded; the present invention is primarily applicable to the bonded type.

Prior art strain gauges typically employ strain sensitive wire as the translating element. Recently the use of semiconductor elements has been adopted. The element, whether metal or semiconductor, when subjected to tension, changes in dimension and electrical resistivity and therefore in overall resistance. It is this change in resistance which is measured to determine the magnitude of the applied force which produces the tension.

The name given to a change in resistivity caused by applied stress is the piezoresistance effect. This effect is particularly pronounced for semiconductor materials including silicon and germanium.

A thin rod or bar of any material exhibiting a sufficient piezoresistance effect can be used in a manner similar to that of the well known prior art wire strain gauges. Young's modulus, E, relates the change in stress to the strain by the equation, $$E = \frac{S}{\epsilon}$$

where S represents stress and $\epsilon$ represents strain. In a crystalline material such as silicon, E varies with direction, $\epsilon$, in the above equation, is the longitudinal strain resulting from simple stress, S, assuming no stress in the transverse direction. The fractional change in resistivity due to a stress S is $$\frac{\Delta \rho}{\rho} = \pi S$$

where $\pi$ is the longitudinal piezoresistance coefficient and where $\rho$ represents the resistivity of the material. Thus, $$\frac{\Delta \rho}{\rho} = \epsilon \pi E$$

This can be written as M$\epsilon$, where M is defined as $\pi$E.

Since R of any material $= \rho L/A$, where R is the resistance of a rod, $\rho$, the resistivity, L its length and A its cross-sectional area, it can be shown, for a simple case that $$\Delta \frac{R}{R} = (1 + 2\delta + M)\epsilon$$

$\delta$ denotes Poisson's ratio; i.e., the ratio of the magnitude of transverse strain to longitudinal strain resulting from the postulated simple stress S. In the above equation, the first term on the right expresses the resistance change due to change in length; the second term is due to the change in area; and, the third term is due to the resistivity change. The factor $$K = \Delta \frac{R}{R\epsilon} = 1 + 2\delta + M$$

is called the gauge factor. Most of the commonly used wire strain gauges have a gauge factor of between 2 and 4. P type silicon has a gauge factor along the [111] direction from 70 to 200. Likewise, N type silicon has a comparable gauge factor along the [100] direction. Germanium also exhibits a high factor, dependent upon orientation and conductivity type. Thus, there is indicated an increase in sensitivity of up to 100 to 1 over ordinary materials. The strain gauge of the present invention advantageously employs this phenomenon.

Prior art metallic strain gauges which are typically wire and have a relatively low gauge factor, as indicated above. Further, the output signals produced by such gauges and the signal-to-noise ratio are both relatively low. Additionally, the accuracy of such prior art strain gauges is affected by hysteresis due to plastic and metallic flow. The mechanical stability of such wire strain gauge elements is relatively poor and the resistivity low.

This invention is particularly concerned with semiconductor strain gauges of the bonded type. One presently used method for bonding the strain gauge element involves the direct use of an adhesive between the strain gauge element and the test piece whose strain is to be measured. Another prior art method involves the bonding to the test piece of a strain gauge which includes a carrier member to which the element is affixed. When using either method the linearity of the curve of resistance change ($\Delta R/R$) as a function of strain is non-linear when the applied force is a compression force for currently known semiconductor strain gauge elements of P type conductivity having a [111] orientation. Conversely, for elements of N type conductivity having a [100] orientation the curve is non-linear when the applied force is a tensile force.

This "built-in" defect generally limits the type of strain for a semiconductor strain gauge otherwise consistent with high accuracy and reliability for the purposes indicated. For example, such devices utilizing P type silicon elements having a [111] orientation do not provide the desired linearity when subjected to a compressive load resulting in a strain of more than about 500 microinches per inch, while such filaments may easily withstand a tension load resulting in a strain of up to 4,000–6,000 microinches per inch.

The non-linearity problem inherent in semiconductor strain gauge elements is amplified when strain measurements are made at elevated temperatures. Typically the gauge element is bonded to the surface of the test piece with a cement which must be cured at an elevated temperature, usually within the range of from 250° F. to 450° F. At the elevated cure temperature the test piece will, of course, expand to thereby place it either in tension or compression due to the differing thermal expansion of the test piece which will, of necessity, be heated during curing of the cement. Typically the thermal coefficient of expansion of the semiconductor strain gauge element is considerably less than that of the test piece, so that whatever expansion might occur in the gauge element during the cure cycle will be small relative to that of the test piece. Thus, upon cooling, the test piece will contract to a greater extent than will the gauge element, thereby placing the gauge element into compression. If the gauge element is of P type conductivity with a [111] crystallographic orientation, this effect serves to further extend the non-linearity of the device.

Another disadvantage attendant with prior art semiconductor strain gauges is the fact that upon installation in the field inconsistent results are often obtained. This is believed to be caused by the difficulties encountered in controlling the cure pressure and temperature of the adhesives ordinarily used to bond the gauge to the test piece. Improper mixing of the adhesive and surface contamination are further problems resulting in inaccuracies.

It is a desideration of the present invention to provide a semiconductor strain gauge which exhibits linearity over a substantially wider range than has heretofore been achievable, and which is not subject to the attendant disadvantages of the prior art devices as herein described.

Accordingly, it is an object of the present invention to provide a bonded semiconductor strain gauge of improved design.

Another object of the present invention is to provide a bonded semiconductor strain gauge exhibiting linearity of response of a wider range than has heretofore been achievable.

Still another object of the present invention is to provide a semiconductor strain gauge which is more reliable and less subject to the vagaries of field installation.

A still further object of the present invention is to provide a strain gauge which is joinable to the test piece by welding, or soldering or the like.

Yet another object of the present invention is to provide a semiconductor strain gauge relatively free from hysteresis.

A further object of the present invention is to provide a semiconductor strain gauge of improved stability and reliability.

A still further object of the present invention is to provide a strain gauge of the character described whose output is relatively insensitive to temperature over a wide temperature range.

In accordance with the principles of this invention a semiconductor strain gauge element of a single crystalline nature and of a generally elongate rectangular shape is disposed upon a carrier member fabricated of a material having a predetermined thermal coefficient of expansion. If the material is a metallic one it is one which is preferably suitable for welding to the test piece. The strain gauge element is fixidly secured upon a substantially planar surface of the member by an adhesive. The thermal coefficient of expansion of the carrier material is chosen so that it will differ in a predetermined relationship from that of the semiconductor element. Thus, upon heating to cure the adhesive material the element will expand to a different extent than the carrier member and, upon cooling, will be selectively prestressed either in tension or compression to thereby expand the range of linearity of the device.

The novel features which are believed to be characteristic of the present invention together with further objects and advantages thereof, will be better understood from the following description in which the invention is illustrated by way of example. It is to be expressly understood, however, that the description is for the purposes of illustration only and that the spirit and the scope of the invention is defined by the accompanying claims.

In the drawing:

FIGURE 1 is a plan view of a semiconductor strain gauge constructed in accordance with the presently preferred embodiment of this invention;

FIGURE 2 is a view taken along line 2—2 of FIGURE 1;

FIGURE 3 is a plan view of the strain element forming a part of the gauge of FIGURES 1 and 2;

FIGURE 4 is a partial elevation of the element of FIGURE 3;

FIGURE 5 is a curve showing a plot of the change in resistance as a function of strain for a common semiconductor strain gauge; and, FIGURE 6 is a graph showing the coefficients of expansion of Nilvar and silicon as a function of temperature.

The invention will be illustrated by a presently preferred embodiment utilizing a P type silicon semiconductor strain gauge element having a [111] orientation and of a generally elongate rectangular shape disposed within a slot provided within a substantially flat carrier member. The strain gauge element is fixedly secured within the slot so that it lies flat therein and with its longitudinal axis coincident with the neutral axis of the carrier member. Referring now to the drawing there is shown in FIGURES 1 and 2 a strain gauge, generally indicated by the reference numeral 10, including a carrier member 12 and a silicon semiconductor element 15, the carrier member 12 being of a material having a coefficient of thermal expansion less than that of silicon. A material which has been found to be particularly satisfactory as the carrier member 12 is an alloy including 36% nickel and 64% iron, sold under the trademark Nilvar by the Driver-Harris Company of Detroit, Michigan. The thermal coefficient of expansion of this material is approximately 0.55 part per million per degree Fahrenheit at temperatures up to about 370° F. Silicon, on the other hand, has a thermal coefficient of expansion of 1.3 p.p.m./° F. Thus, with silicon as the semiconductor material for the strain element 15 any carrier member material, preferably a metal for reasons hereinafter to be discussed, having a linear thermal coefficient of expansion of less than 1.3 p.p.m./° F. is satisfactory for use with P type silicon having a [111] orientation.

A slotted opening 20 is provided within the upper portion of a carrier 12 and extends to a depth below the longitudinal center line 22 intermediate the upper and lower faces 25 and 26 of the carrier member. The center line 22 is thus coincident with the neutral axis of the carrier member. The slot 20 is of such depth that when the element 15 is disposed within the slot the neutral axis of the element 15 will coincide with the neutral axis of the carrier member 12. As can be seen in FIGURES 1 and 2 the carrier member 12 assumes a generally rectangular shape having a thickness dimension substantially less than the length and width dimensions. The slot 20 is centrally located within face 25 of the carrier member and extends throughout almost the entire length thereof.

The slot 20 may be produced by any means known to the art such as by chemical etching or ultra-sonic cutting. Disposed within the slot 20 is the silicon semiconductor crystal element 15 preferably of a shape that is shown in FIGURES 3 and 4. The semiconductor crystal element 15 is a single crystal of P type silicon with a [111] crystallographic orientation in order to obtain a high piezoresistance coefficient. However, as will be discussed more fully hereinafter, N type silicon with a [100] crystallographic orientation or germanium can also be utilized when the carrier member material is properly predetermined.

The strain gauge element 15, in accordance with the presently preferred embodiment of this invention is shaped as shown in FIGURES 3 and 4. In elevation (FIGURES 2 and 4) it is essentially a rectangle having a lower surface 31 while in plan view (FIGURES 1 and 3) it is of dumbbell-like shape including a relatively thin long rectangular central section 30 separating two enlarged generally rectangular end sections 32 and 34. This shape is produced by appropriate masking and chemical etching in accordance with well known prior art practice. Note the rounded corners joining sections 32 and 34 with central elongate sections 30. This is a natural result of the etching process and is desired in order to eliminate sharp corners in areas of stress to prevent rupture of the element.

The silicon strain gauge element of FIGURES 3 and 4 is disposed within the slot 20 of the carrier member 12 with the lower surface 31 parallel and just above the bottom surface 21 of the slot. Disposed adjacent the opposed ends of the element 15 within the slot 20 are two L-shaped terminal blocks 40 and 42. The terminal blocks are of an insulator material such as ceramic. The upper surface of the vertical portion of the L, the upper surface of the horizontal portion of the L and the surface connecting these portions are metallized, as is indicated by the numerals 46, 47, 48 and 49 for the two blocks.

The terminal blocks 40 and 42 are disposed within the slot 20 at opposed ends of the element 15 in such a position that the combination of the blocks and the element forms a U-shape within the slot.

Ohmic contacts 50 and 52 are provided near opposed ends of the element 15 and lead wires 61 and 62 respectively interconnect these ohmic contacts with the metallized portions 47 and 48 of the blocks. Finally, leads 56 and 58 respectively are bonded to the upper metallized portions 46 and 49 of the terminal blocks 40 and 42.

An adhesive material 60 is used to bond the terminal blocks and the element 15 in position as shown in FIGURE 2. Enough adhesive material is provided to fill the slot 20 to a level above the element 15 and the lower surface portions 47 and 48 of the terminal blocks, but leaving exposed the upper metallized portions 46 and 49. The adhesive material 60 should be suitable for high temperature applications and be an electrical insulator. Expoxylite #813–9 is presently preferred.

In the fabrication of the gauge 10 the terminal blocks 40 and 42 are electrically connected to ends of the element 15 by electrical leads 61 and 62, respectively, and the resulting assemblage then positioned within the slot and the carrier 12, the surfaces of the slot having been coated with a predetermined quantity of the adhesive 60. Additional adhesive material 60 is then applied to cover the element 15 and the lower surface portions 47 and 48 of the terminal blocks 40 and 42. Next, the adhesive material 60 is cured by maintaining the gauge assembly at an elevated temperature not in excess of 400° F. for a few hours (about 1–6 hours), and the gauge assembly then allowed to cool. The heating of the semiconductor element 15 and the carrier member 12 during the curing process causes these components to expand in accordance with their respective different coefficients of thermal expansion. The element 15 becomes bonded to the carrier member 12 during this curing step and upon subsequent cooling the element 15 becomes prestressed in tension because of the differing rates of contraction of the components. Since the longitudinal axis of the gauge element 15 is in coincidence with the neutral axis of the carrier member 12 the tendency for creation of a bending moment upon the differential contraction of these two components is minimized.

The intentional prestressing of the element 15 during fabrication of the gauge 10 results in a gauge which, unlike the prior art semiconductor strain gauges, exhibits a linear resistance change in compression as well as tension. Referring to FIGURE 5 of the accompanying drawing there is shown a graphical representation of the resistance change of the semiconductor strain gauge element as a function of physical distortion of the element. The curve 65 is shown with reference to two different sets of axes, the first set consisting of an ordinate 66 and an abscissa 67, and the second set consisting of an ordinate 68 and an abscissa 69. Viewing the curve 65 with reference to the first set of axes (66 and 67) shows the typical prior art semiconductor strain gauge characteristic with a linear portion extending to the right of the ordinate axis 66 (and representing resistance change as a function of tension) and a curved portion extending to the left of the ordinate axis 66 (and representing resistance change as a function of compression). Viewing the curve 65 with reference to the second set of axes (68 and 69) shows the characteristic of the semiconductor strain gauge of the present invention, with linear resistance change characteristics for both tension and compression. The prestressing in tension of the strain gauge element 15 in the gauge 10 of the illustrated embodiment effectively shifted the graphical reference coordinates from the first to the second set of axes, thereby resulting in improved resistance change characteristics.

Thus it was seen that in the illustrated embodiment the material selected for the carrier member possessed a coefficient of expansion less than that of silicon. Since the coefficient of expansion of the material used (Nilvar) in this embodiment was less than that of the semiconductor material (silicon) its contraction was less upon cooling and the element 15, having been bonded to the carrier member 12 at the higher curing temperature, was placed in tension as it tried to contract to a greater degree than the carrier member surface.

As noted previously, N type silicon can also be used in accordance with the present invention when oriented along the [100] direction. When N type silicon is utilized the resistance change as a function of physical distortion of the element is a mirror image of the graphical representation of FIGURE 5, with the linear resistance change occurring in compression and with the slope of the curve reversed from that of FIGURE 5. To obtain a linear device in accordance with the present it is therefore necessary to prestress the aforementioned N type silicon in compression. Accordingly, a carrier member material having a coefficient of expansion greater than that of the silicon is utilized. One such material is 17–4ph stainless steel. When such a material is used in the manner described hereinabove and bonding effected at an elevated temperature, upon cooling the member 12 will contract to a greater extent than will the element 15 to thereby prestress the element 15 in compression to provide the desired linear gauge characteristics.

In addition, a study of FIGURE 6 shows that Nilvar, when heated to temperatures above 400° F. possesses a coefficient of expansion greater than that of silicon, and hence could be used for the prestressing of silicon in compression at the indicated elevated temperatures. Furthermore, although in the hereinabove illustrated embodiment the semiconductor element was mounted in a depression in the carrier member to bring their respective neutral axes into coincidence, it is apparent that the semiconductor elements could also be bonded to the flat surface of a rectangular plate carrier member. Hence, although the present invention has been described with a certain degree of particularity it is understood that the present disclosure has been made only by way of example and that numerous changes in the details of construction and the combination and arrangement of parts may be resorted to without departing from the spirit and the scope of the invention as hereinafter claimed. For example, although the carrier member of the illustrated embodiment was of a unitary construction, a laminated form of construction is equally suitable, with the slot being formed by a hole through one layer placed adjacent to a solid layer.

Thus there has been described novel and improved semiconductor strain gauges which exhibit linear resistance change characteristics under both applied tension and compression and which possess a wide range of temperature stability. The gauges can be bonded to a test surface by an adhesive or by welding, welding providing the additional advantage of minimizing the effect of differences in the coefficient of expansion of the gauge carrier member and the test surface.

What is claimed is:

1. A semiconductor strain sensitive device comprising, in combination: a relatively thin elongate carrier member; and, an elongate strain element of P type semiconductor material having a [111] crystallographic orientation, the thermal coefficient of expansion of said semiconductor material being a predetermined amount greater than that of said carrier member at a predetermined temperature, said element being rigidly secured to said carrier member and maintained thereby under a predetermined longitudinal tension and with the longitudinal axis of said element in substantial coincidence with the neutral axis of said carrier member.

2. A semiconductor strain sensitive device comprising, in combination: a relatively thin elongate carrier member; and, an elongate strain element of N type semiconductor material having a [100] crystallographic orientation, the thermal coefficient of expansion of said semicoductor material being a predetermined amount less than that of said carrier member at a predetermined temperature, said element being rigidly secured to said carrier member and maintained thereby under a predetermined longitudinal compression and with the longitudinal axis of said element in substantial coincidence with the neutral axis of said carrier member.

3. A semiconductor strain sensitive device comprising, in combination: an elongate carrier member defining a longitudinal recess in one of the major surfaces thereof, said recess intersecting the neutral axis of said carrier member, said carrier member being of a material having a thermal coefficient of expansion significantly less than the thermal coefficient of expansion of silicon at a predetermined temperature; and, an elongate strain element of P type silicon having a [111] crystallographic orientation, said element being disposed within said recess and rigidly secured to said carrier member under a predetermined tension and with the longitudinal axis of said element in substantial coincidence with the neutral axis of said carrier member.

4. A semiconductor strain sensitive device comprising, in combination: an elongate carrier member defining a longitudinal recess in one of the major surfaces thereof, said recess intersecting the neutral axis of said carrier member, said carrier member being of a material having a thermal coefficient of expansion significantly greater than the thermal coefficient expansion of silicon at a predetermined temperature; and, an elongate strain element of N type silicon having a [100] crystallographic orientation, said element being disposed within said recess and rigidly secured to said carrier member under a predetermined compression and with the longitudinal axis of said element in substantial coincidence with the neutral axis of said carrier member.

5. A semiconductor strain sensitive device comprising, in combination: an elongate carrier member defining a longitudinal recess in one of the major surfaces thereof, said recess intersecting the neutral axis of said carrier member, said carrier member being of a material having a thermal coefficient of expansion significantly less than the thermal coefficient of expansion of silicon at a predetermined temperature; and, an elongate strain element of P type silicon having a [111] crystallographic orientation, said element being disposed within said recess and rigidly secured to said carrier member with an electrical insulating adhesive substance and under a predetermined longitudinal tension with the longitudinal axis of said element in substantial coincidence with the neutral axis of said carrier member.

6. A semiconductor strain sensitive device comprising, in combination: an elongate carrier member defining a longitudinal recess in one of the major surfaces thereof, said recess intersecting the neutral axis of said carrier member, said carrier member being of a material having a thermal coefficient of expansion significantly greater than the thermal coefficient of expansion of silicon at a predetermined temperature; and, an elongate strain element of N type silicon having a [100] crystallographic orientation, said element being disposed within said recess and rigidly secured to said carrier member with an electrical insulating adhesive substance and under a predetermined longitudinal compression with the longitudinal axis of said element in substantial coincidence with the neutral axis of said carrier member.

7. A semiconductor strain sensitive device comprising, in combination: an elongate carrier member defining a longitudinal recess in one of the major surfaces thereof, said recess intersecting the neutral axis of said carrier member; and, an elongate strain element of P type semiconductor material having a [111] crystallographic orientation, the thermal coefficient of expansion of said semiconductor material being a predetermined amount greater than that of said carrier member at a predetermined temperature, said element being disposed within said recess in said carrier member and rigidly secured to said carrier member under a predetermined tension and with the longitudinal axis of said element in substantial coincidence with the neutral axis of said carrier member.

8. A semiconductor strain sensitive device comprising, in combination: an elongate carrier member defining a longitudinal recess in one of the major surfaces thereof, said recess intersecting the neutral axis of said carrier member; and, an elongate strain element of N type semiconductor material having a [100] crystallographic orientation, the thermal coefficient of expansion of said semiconductor material being a predetermined amount less than that of said carrier member at a predetermined temperature, said element being disposed within said recess in said carried member and rigidly secured to said carrier member under a predetermined compression and with the longitudinal axis of said element in substantial coincidence with the neutral axis of said carrier member.

References Cited in the file of this patent

UNITED STATES PATENTS

| 2,548,592 | De Michele | Apr. 10, 1951 |
| 2,554,324 | Chambers | May 22, 1951 |
| 2,558,563 | Janssen | June 26, 1951 |
| 2,649,569 | Pearson | Aug. 18, 1953 |
| 2,789,068 | Maserjian | Apr. 16, 1957 |
| 2,837,619 | Stein | June 3, 1958 |

OTHER REFERENCES

Mason: "Semiconductors in Strain Gauges," January 1959; article from "Bell Labs Record," volume 37, 1959; pages 7–9 relied on.